United States Patent [19]

Popenoe

[11] Patent Number: 5,189,979
[45] Date of Patent: Mar. 2, 1993

[54] FLUID PRESSURE INDICATOR

[76] Inventor: Charles H. Popenoe, 6307 Wiscasset Rd., Bethesda, Md. 20816-2111

[21] Appl. No.: 861,539

[22] Filed: Apr. 1, 1992

[51] Int. Cl.$^5$ .......................... G01F 7/08; G01F 19/14
[52] U.S. Cl. ..................................... 116/273; 73/715; 116/276
[58] Field of Search ............... 116/266, 268, 276, 273; 411/13; 73/715

[56] References Cited

U.S. PATENT DOCUMENTS

| | | |
|---|---|---|
| 3,703,879 | 11/1972 | Huthsing, Jr. . |
| 3,780,693 | 12/1973 | Parr ............................. 116/34 R X |
| 3,872,268 | 3/1975 | Hata ................... 116/34 R |
| 3,987,699 | 10/1976 | Popenoe . |
| 4,020,784 | 5/1977 | Greene ................. 116/268 |
| 5,014,786 | 5/1991 | Kobayashi . |

Primary Examiner—Daniel M. Yasich

[57] ABSTRACT

A simple and compact fluid pressure indicator comprising a housing having a passage communicating with the pressure to be monitored leading to an interior chamber, a flexible diaphragm sealing and dividing the chamber into two parts, a colored indicator area on one side of the diaphragm, a light transmitting viewing window axially aligned with and parallel to the indicator area, and a sealed flexible envelope of light-absorbing fluid interposed between the indicator area and viewing window. A change in the monitored pressure causes the diaphragm to flex and the indicator area to be displaced, altering the thickness of the absorbing fluid envelope, and therefore the amount of light reflected from the indicator area. Thus a very small change in pressure will result in a dramatic color change displayed in the viewing window, providing a sensitive pressure indication.

3 Claims, 1 Drawing Sheet

FLUID PRESSURE INDICATOR

BACKGROUND OF THE INVENTION

1. Field of the Invention

The present invention generally relates to pressure indicators, and more particularly to a simple device which allows quick visual indication of whether the monitored fluid pressure is less than, equal to or greater than a predetermined pressure.

2. Description of the Prior Art

In many applications which employ pressure gages, there is no need for the user to know the exact pressure, but only whether it is above or below a certain desired pressure. There have been many pressure indicating devices proposed for presenting a visual indication at a certain preselected fluid pressure, as alternatives to the traditional Bourdon tube pressure gage. The history of inventions in this field in the patent literature attests to a long-felt need for a practical and inexpensive pressure indicator. However, these prior devices have not met with commercial success because they have in general been overly complex, and therefore expensive to manufacture, or have been characterized by having a gradual, low resolution response to pressure, presenting an indication which is indefinite and difficult to interpret.

Among the prior art, U.S. Pat. No. 3,703,879 (Huthsing) teaches a pressure indicator comprising a housing, window pane means, an elastomeric diaphragm moving under pressure towards the window pane means to operate an indicating means. The first of two embodiments of indicating means disclosed by Huthsing includes an indicating fluid, which gradually moves up an indicator window when displaced by the deformed pressurized diaphragm, and the other embodiment having a raised portion on the diaphragm which moves under pressure towards an inside frosted viewing window. The fluid indication depends on gravity, and therefore suffers degradation of the indication in certain orientations. Both indicating means suffer from vague and imprecise indications, in that large displacements of the diaphragm produce only minor visual effects in the viewing window.

U.S. Pat. No. 3,987,699 (Popenoe) teaches an opti-mechanical displacement microindicator comprising a transparent flexible envelope containing a light-absorbing fluid, a viewing window and an opposite wall indicator portion. This device is characterized by extreme simplicity and sensitivity, changing its appearance dramatically, for instance, from black to bright red when deformed by as little as 0.001 inch. The instant invention uses features of this microindicator in a pressure-indicating device.

U.S. Pat. No. 5,014,786 (Kobayashi) teaches a pressure checker comprising a main unit having a hollow bore, a spool acted upon by the monitored pressure, a compression spring biasing the spool in opposition to the pressure; whereby the spool under pressure is displaced axially to press upon a microdisplacement indicator as taught in U.S. Pat. No. 3,987,699 (Popenoe), thus providing visual indication of the desired pressure. This device will have a high sensitivity, in that a small pressure change will result in a dramatic visual color change as viewed through the window, but suffers from unnessary complexity, as well as considerable friction in the internal parts leading to insensitivity and excessive deadband.

The prior art devices have not provided a simple. inexpensive and compact visual pressure indicator offering high sensitivity and rapid change of indicator presentation over a narrow pressure range. Clearly, many applications which presently use Bourdon tube gages could benefit from substitution of a simple and practical go/no go type visual pressure indicator.

SUMMARY OF THE INVENTION

An object of the present invention is to provide a pressure indicator which is characterized by utmost simplicity, compact size and therefore low cost. A further object is to provide a high sensitivity indication displaying a dramatic and eye-catching visual color change which occurs over a relatively narrow pressure range. It is an additional object of the invention to provide a pressure indicator having only flexural elements, eliminating insensitivity or lost motion inherent in sliding, rotational or other frictional motions.

These objects are achieved in the present invention, which in one embodiment is in the form of a housing having an opening communicating with the pressure to be monitored, and a passage leading to an interior chamber. This chamber is divided and sealed by a flexible diaphragm into two chambers, one pressurized by the monitored pressure, and the other pressurized by a reference pressure, which, if the second chamber is vented to the atmosphere, would be atmospheric pressure. The diaphragm has on one side a light reflecting or colored indicator area, which is displaced axially as the diaphragm flexes due to the pressure difference across its area. A transparent window is aligned axially with the indicator area and forms a closure between the viewer and the interior chamber. A sealed envelope of flexible transparent material containing an optically dense, light-absorbing fluid is sandwiched between the indicator area and viewing window. Thus, the pressure difference across the flexible diaphragm causes it to be displaced toward the direction of lesser pressure. The indicator area is displaced with respect to the viewing window, changing the envelope's thickness, and therefore the thickness of light-absorbing fluid. An adjustment means allowing displacement of the window and diaphragm with respect to each other may be optionally added to facilitate calibration during manufacture or adjusting settings in the field.

The above combination of elements results in a surprising and synergistic improvement in the sensitivity of prior art diaphragm pressure indicators with no significant increase in cost. In contrast with prior art devices, the color or brightness change signalling that the preselected design pressure has been reached occurs over a very narrow pressure range, corresponding to a displacement of the diaphragm of only approximately 0.001 inch. The lack of friction of the device also ensures that the repeatability of the indication is of similar precision.

DETAILED DESCRIPTION OF THE PREFERRED EMBODIMENT

Figure 1:
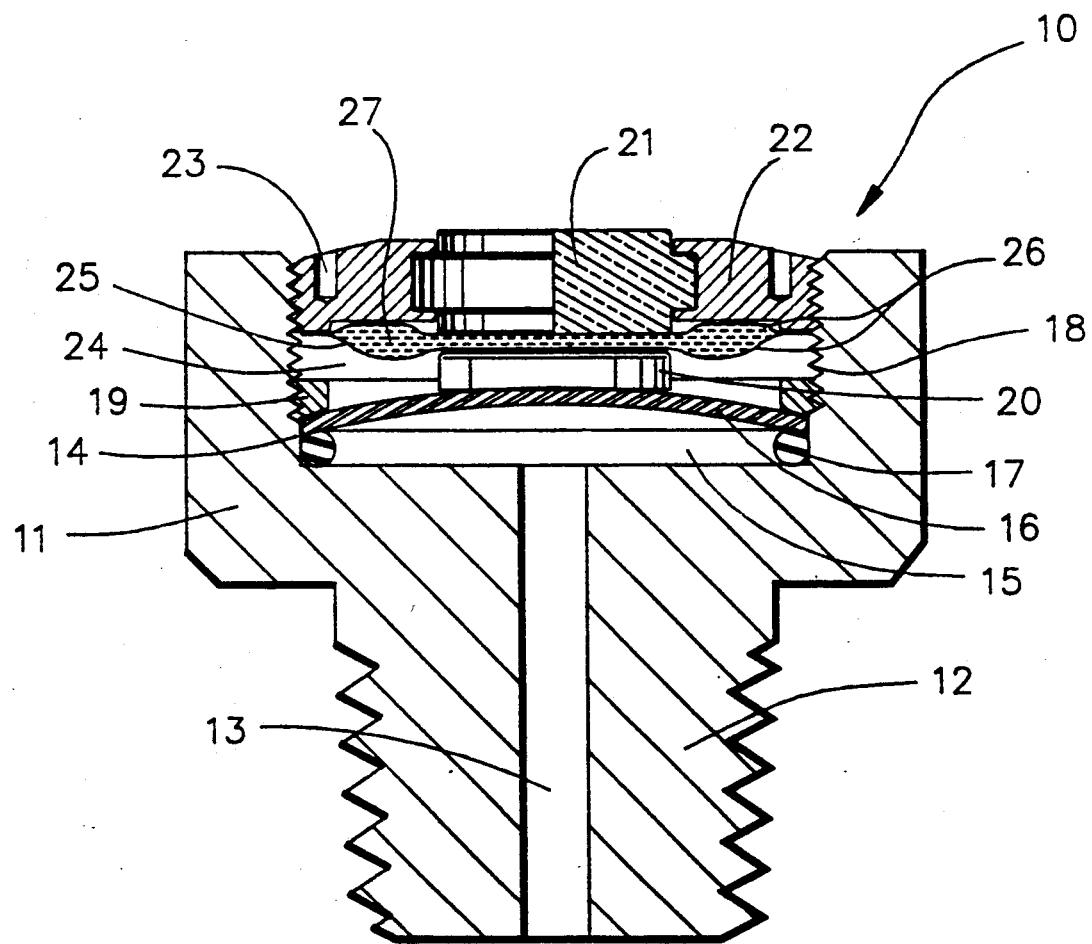
FIG. 1 is a greatly magnified longitudinal sectional side view of a pressure indicator in one preferred embodiment. As an example, it is shown having a conventional male pipe thread fitting for attachment and communication with a fluid pressure source.

Referring now to the drawings, there is shown in FIG. 1 a screw-in self-contained pressure indicator 10, comprising a housing 11 having, for example, a male pipe thread fitting 12 for mechanical and fluid connection to the pressure source to be monitored. The exterior of housing 11 may be formed in a shape suitable for wrenching, such as hexagonal or square. The fluid pressure is communicated through passage 13 into a cylindrical bore 14 forming first chamber 15, bounded by a flexible diaphragm 16 and sealed by a gasket or O-ring seal 17. Flexible diaphragm 16 is shown in a deflected condition, deformed elastically upward due to the higher pressure in first chamber 15. Diaphragm 16 is formed of a material and thickness consistent with the pressure range to be monitored, i.e. for higher pressures, it has been formed from spring steel or phosphor bronze, while for lower pressures it would be made from a plastic or an elastomeric material. Many other materials would also be suitable.

The housing 11 also includes a threaded bore 18 from its opposite end, into which a threaded ring 19 is screwed to retain diaphragm 16 and urge it into firm sealing contact with seal 17. An indicator disk 20 is bonded as by adhesive or welding to the center of the outer surface of diaphragm 16, and may be colored a bright color such as red or yellow. A transparent window 21 is positioned in axial parallel alignment with indicator disk 20 by window mount ring 22. The outer periphery of mount ring 22 is threaded to match the internally threaded bore 18, and is provided with sockets 23 for a fitting spanner wrench, by which means the window 21 may be adjusted axially with respect to indicator disk 20.

A second chamber 24 in threaded bore 18 is enclosed by the transparent window 21 and its mount ring 22 on one side and flexible diaphragm 16 on the other. In this preferred embodiment, second chamber 24 is shown vented to the atmosphere through the threads of bore 18, and thus the indicated pressure is "gage" pressure, i.e. is measured with respect to atmospheric pressure. These threads may optionally be sealed, and an additional passage (not shown) could provide communication to the second chamber 24 from a second pressure source, thus providing a differential pressure indication.

A microdisplacement indicator 25 comprising a sealed envelope of transparent flexible film 26 enclosing an optically dense indicator fluid 27 is sandwiched in between window 21 and indicator disk 20 within second chamber 24.

In operation, when there is no pressure difference across diaphragm 16, diaphragm 16 will be flat and indicator disk 20 will be retracted from window 21. In this condition, indicator fluid 27 will fill the space in between window 21 and indicator disk 20, and the thick layer of fluid will totally absorb the illuminating light reflected from indicator disk 20 through the fluid 27 and window 21. The visual appearance to an observer would be a black or very nearly black color, signalling a zero or low pressure condition. As the monitored pressure increases, diaphragm 16 will be deflected toward window 21 reducing the thickness of indicator fluid 27, but because of the very high optical density of the fluid, there will be no change of color of the indicator until the separation between the window 21 and the indicator disk 20 is less than approximately 0.001 inch. At this pressure, the observed indicator color will begin to change, and will change rapidly to the color of the indicator disk 20, for instance, a bright red color, over a narrow increment in pressure.

The pressure indicator may be calibrated during manufacture or in the field by first backing off the threaded adjustment of the mount ring 22, applying a fluid pressure to the inlet equivalent to the desired preselected pressure to be monitored, and finally turning in the mount ring 22 until the separation between window 21 and indicator disk 20 is minimal and the indicator color shows properly through the window. At this point, mount ring 22 could be locked into position by staking, adhesive or any other suitable method to prevent subsequent accidental misadjustments.

Many additional modifications to the above preferred embodiment are possible within the spirit of the invention. For instance, window 21 and mount ring 22 could be molded of transparent plastic in one piece for additional simplification. Another modification would apply the monitored pressure to the second chamber 24 side of the diaphragm 16, thus providing a bright indication of underpressure rather than overpressure. Therefore, the invention is not limited to the examples and embodiments shown in the specification, and many other permutations occurring to those skilled in the art will fall within the scope of the appended claims.

I claim:
1. A fluid pressure indicator comprising:
 a main body having an internal hollow portion communicating with fluid pressure from a fluid pressure source;
 a flexible diaphragm separating said hollow portion into two chambers, wherein one side of the diaphragm is subjected to said fluid pressure and the other side to a reference pressure;
 a light reflecting indicator portion on said diaphragm;
 a light transmitting window;
 means for mounting said window in axial relationship with said indicator portion;
 a displacement indicator comprising a sealed light-transmitting flexible envelope containing light absorbing fluid, said indicator being interposed between said window and said indicator portion; and
 whereby a change in fluid pressure on said diaphragm causes a flexing of the said diaphragm and a change in thickness in said displacement indicator thereby altering the amount of light reflected from said indicator portion through said light-absorbing fluid and said window.

2. The device of claim 1 additionally including means for adjusting said window axially so as to alter the deflection of said diaphragm necessary to cause a preselected reflectance change.

3. The device of claim 1 additionally including means for adjusting said diaphragm axially so as to alter the deflection of said diaphragm necessary to cause a preselected reflectance change.

* * * * *